No. 800,994.
PATENTED OCT. 3, 1905.
H. B. DOUGLAS.
MAGNETIC RIVET HOLDER.
APPLICATION FILED DEC. 2, 1904.
6 SHEETS—SHEET 3.
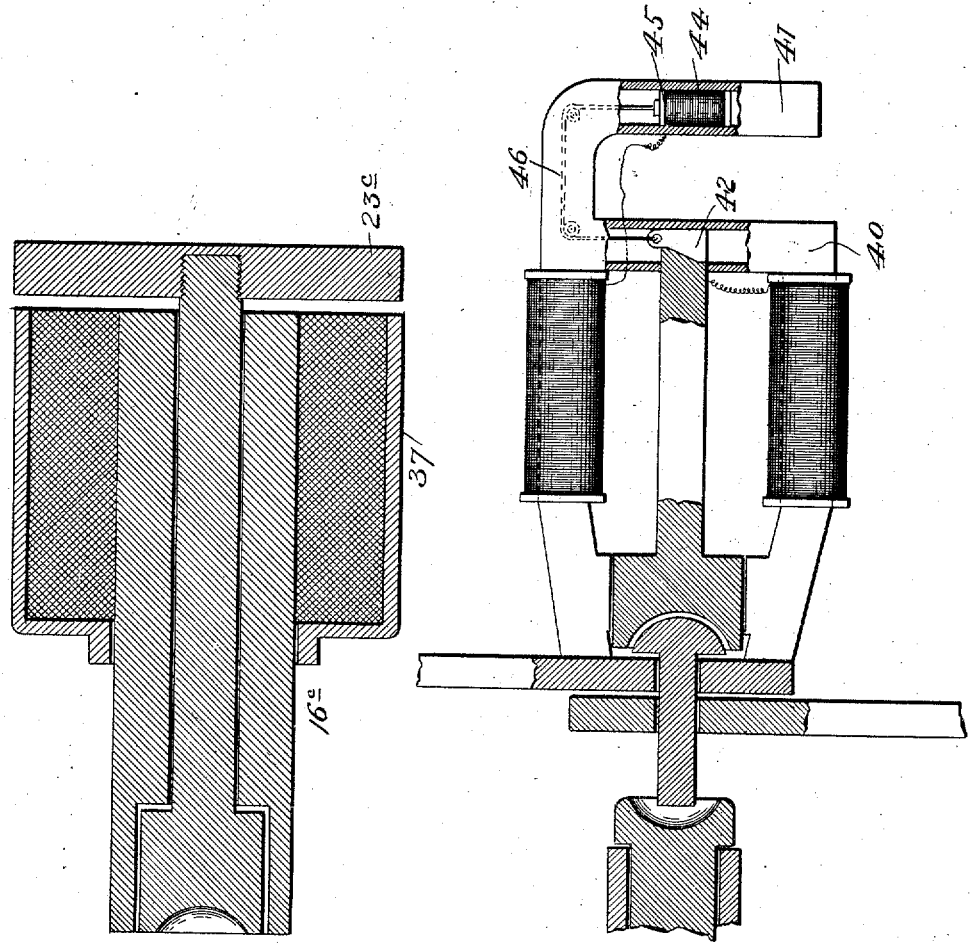
WITNESSES:
F. L. Ourand
Albert Popkins
INVENTOR
H. B. Douglas.
BY
Sturtevant & Greeley
Attorney

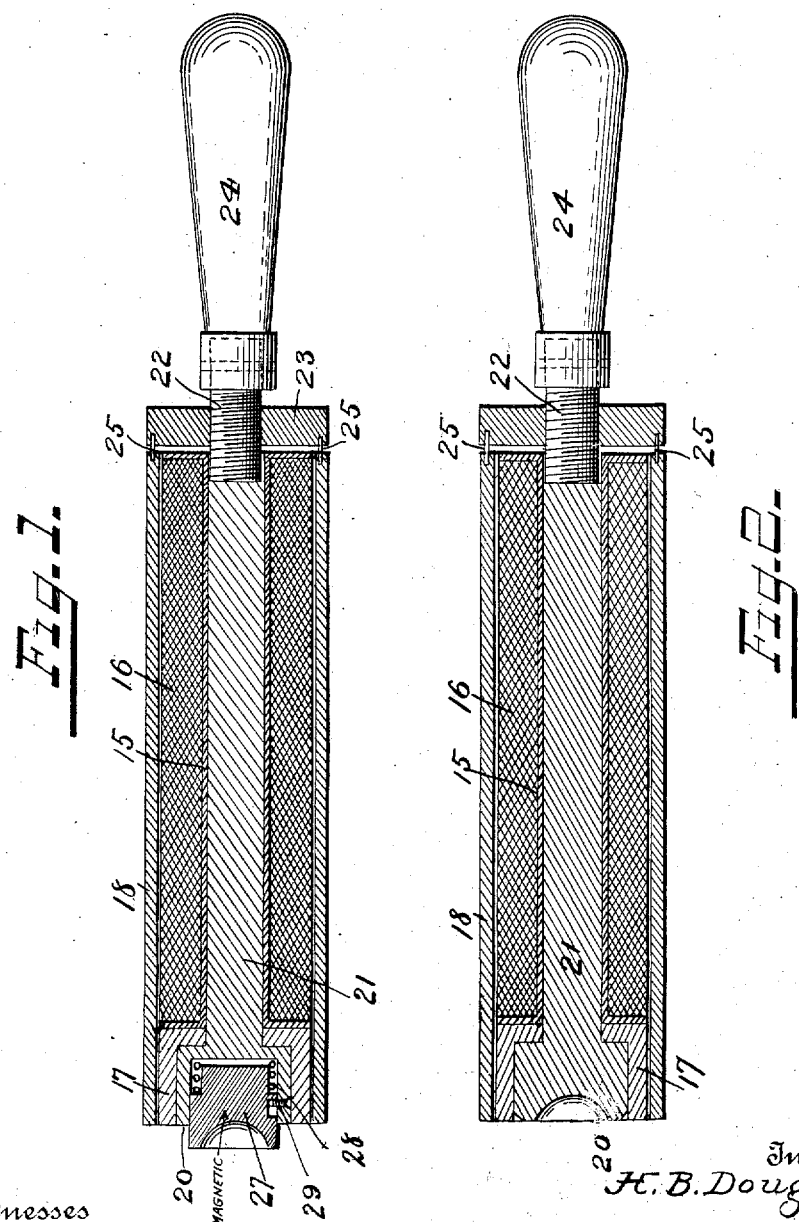

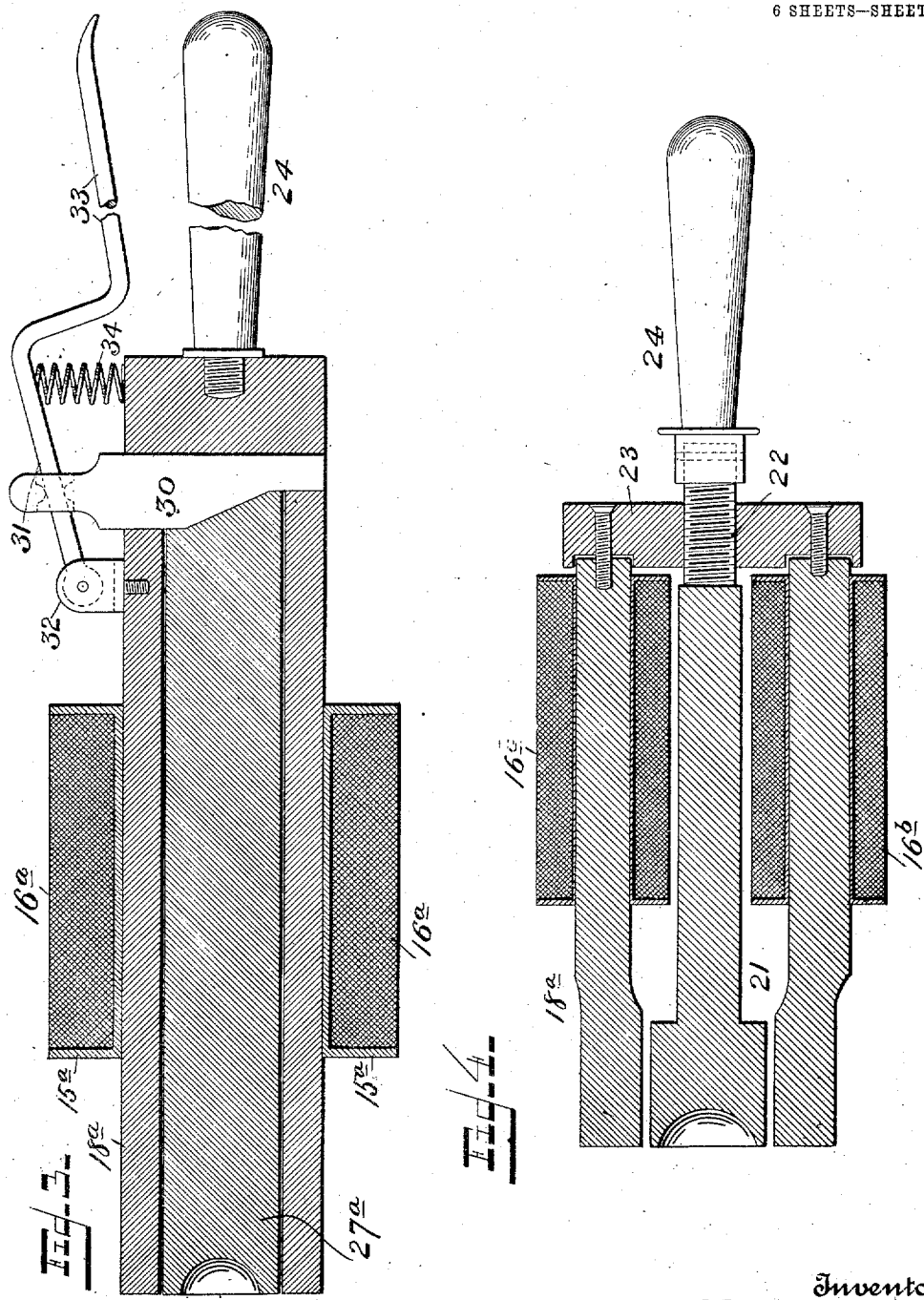

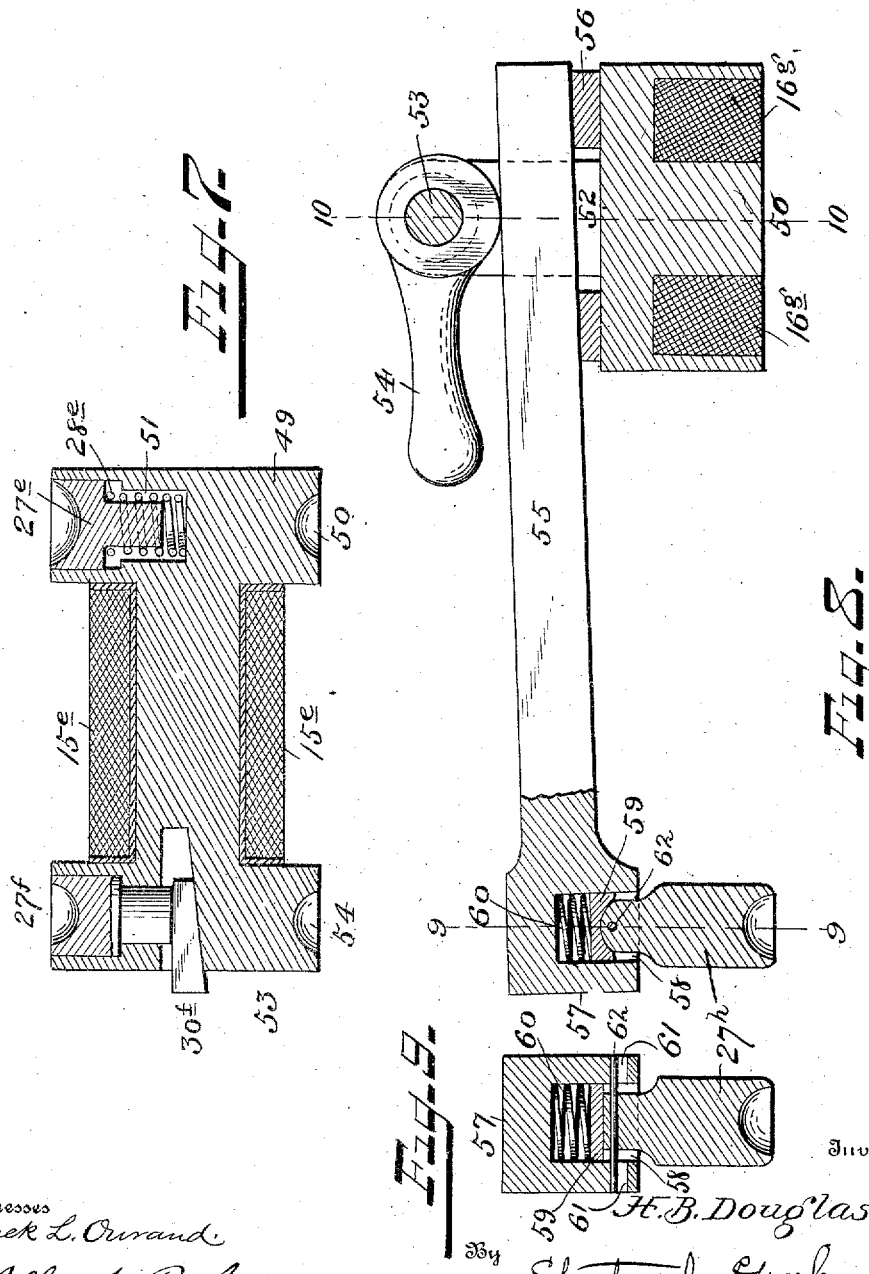

No. 800,994. PATENTED OCT. 3, 1905.
H. B. DOUGLAS.
MAGNETIC RIVET HOLDER.
APPLICATION FILED DEC. 2, 1904.
6 SHEETS—SHEET 5.
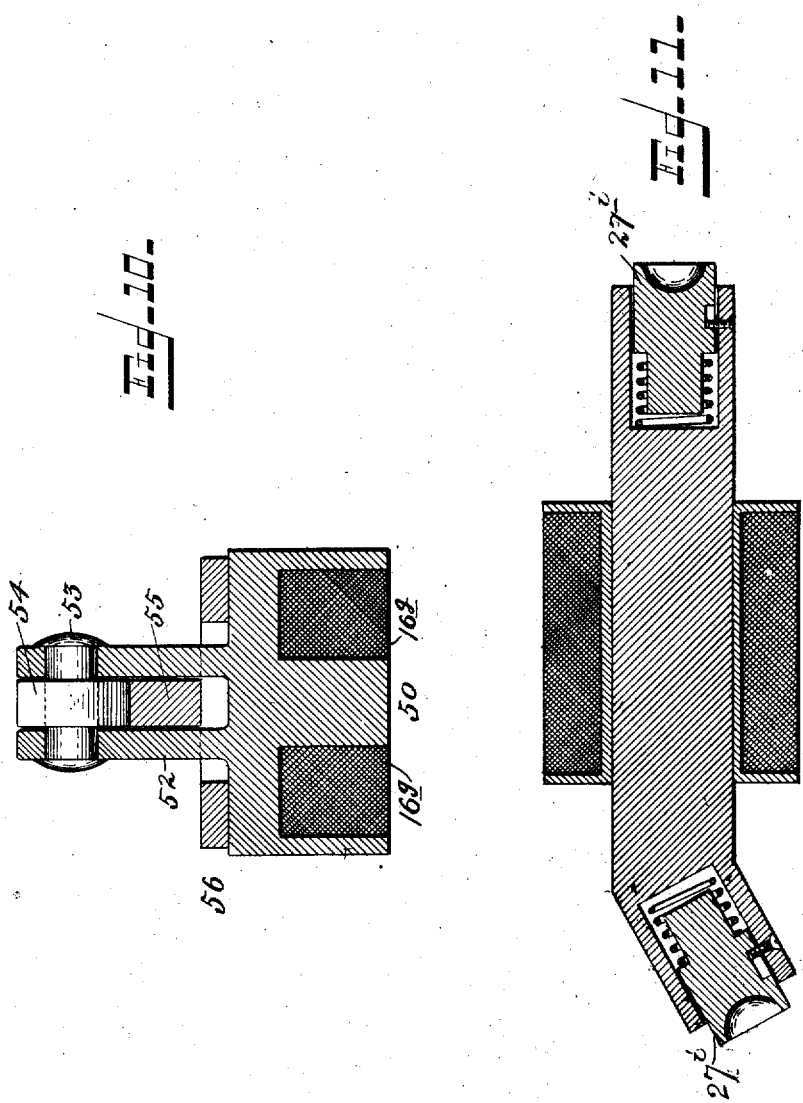
Witnesses
F. L. Ourand.
Albert Hopkins
Inventor
H. B. Douglas
By Sturtevant & Freeby
Attorneys No. 800,994. PATENTED OCT. 3, 1905.
H. B. DOUGLAS.
MAGNETIC RIVET HOLDER.
APPLICATION FILED DEC. 2, 1904.
6 SHEETS—SHEET 6.
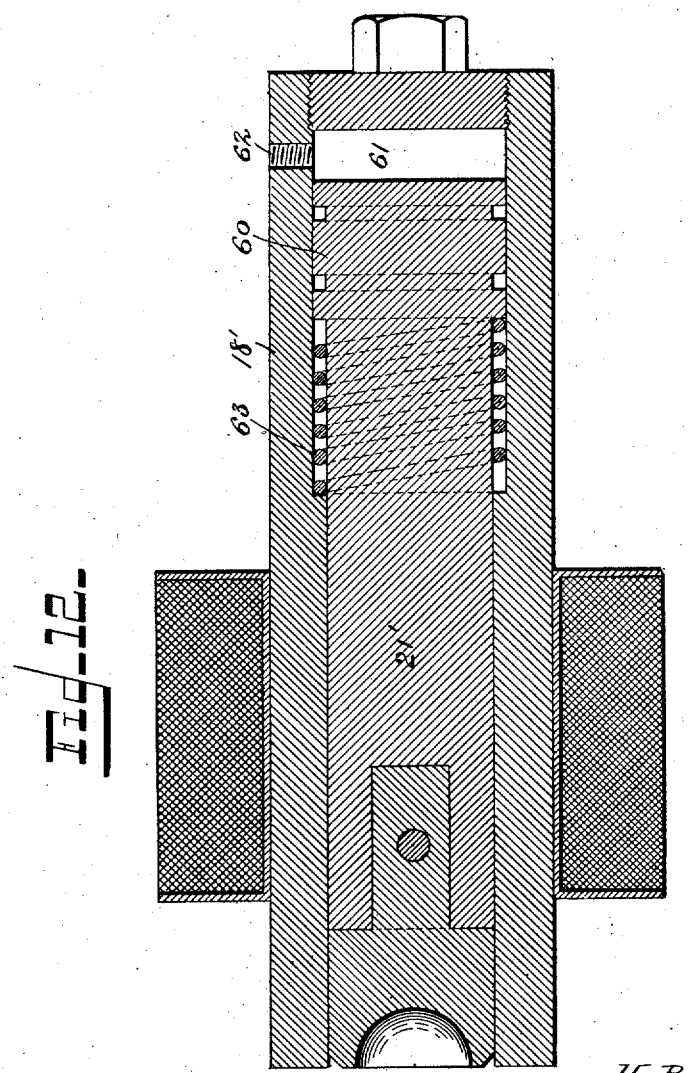
Witnesses
F. L. Ourand.
Albert Hopkins
Inventor
H. B. Douglas.
By Sturtevant & Trueby
Attorneys.

UNITED STATES PATENT OFFICE.

HENDERSON B. DOUGLAS, OF BUTLER, PENNSYLVANIA, ASSIGNOR OF ONE-HALF TO JOHN S. DOUGLAS, OF BUTLER, PENNSYLVANIA.

MAGNETIC RIVET-HOLDER.

No. 800,994.     Specification of Letters Patent.     Patented Oct. 3, 1905.

Application filed December 2, 1904. Serial No. 235,203.

*To all whom it may concern:*

Be it known that I, HENDERSON B. DOUGLAS, a citizen of the United States, residing at Butler, in the county of Butler, State of Pennsylvania, have invented certain new and useful Improvements in Magnetic Rivet-Holders, of which the following is a description, reference being had to the accompanying drawings and to the numerals of reference marked thereon.

This invention relates to devices of that general class employed for holding or "bucking up" rivets during the upsetting or heading operation, and relates principally to improvements in holding-tools which are held in place by electromagnets.

In electromagnetic holders as heretofore constructed the holding set or die has usually been formed of steel or similar paramagnetic material which is attracted to and firmly holds the rivet-head, so that when the opposite end of the rivet is being headed the hammer-blows jarring and displacing momentarily the rivet-holder as a whole will partly withdraw the rivet, and thus render the operation more or less unsuccessful. Another disadvantage of devices in present use is that no provision is made for adjusting the set proper with relation to the holding-magnets, whether the latter be permanent or energized by an electric current.

One object of the present invention is to provide a set or die of a more or less diamagnetic material which will not attract the rivet to an extent sufficient to withdraw it under the hammer-blow.

A further object of the invention is to provide means whereby the sets or dies may be readily adjusted with relation to the magnets to suit rivet-heads of different size and for other purposes.

A still further object of the invention is to provide an electromagnetic holder in which the full strength of the magnet may be utilized in holding the tool to its work.

A still further object of the invention is to provide a tool of this class on which a yieldable cushion or spring is interposed between the set or die and the electromagnetic holder.

With these and other objects in view, as will appear when the invention is more fully disclosed, the invention consists in the novel construction and arrangement of parts hereinafter described, illustrated in the accompanying drawings, and more particularly pointed out in the appended claims.

In the accompanying drawings, Figure 1 is a longitudinal sectional elevation of a rivet set or holder constructed in accordance with the invention. Fig. 2 is a similar view illustrating a modified construction. Fig. 3 is a sectional view of another modified form, showing a set or die adjusting device which may be quickly adjusted by hand or by an auxiliary magnet. Fig. 4 is a view of a further modification illustrating the employment of a horseshoe-magnet. Fig. 5 is a still further modification showing an iron-clad magnet. Fig. 6 is a view illustrating a horseshoe-magnet holder provided with a convenient form of handle. Fig. 7 is a sectional view of a further modification of the invention, showing the application of a single magnetic holder to a number of sets or dies which may be of the same or of different sizes. Fig. 8 is a sectional elevation illustrating a further modification providing for more accurate adjustment of the set or die with relation to the holder to meet varying conditions. Fig. 9 is a transverse sectional elevation of the same on the line 9 9 of Fig. 8. Fig. 10 is a similar view on the line 10 10 of Fig. 8, and Fig. 11 is a sectional elevation of a further modification of the invention. Fig. 12 is a sectional elevation illustrating a still further modification.

Similar numerals of reference indicate corresponding parts throughout the several figures of the drawings.

In Fig. 1 the spool 15 is flanged at both ends and receives a winding 16 of insulated wire of any desired diameter, the coil being connected in any suitable manner to a source of electrical energy, and a switch of any desired character being employed in the manner well known in this art. At one end of the spool is a cup-shaped pole-piece 17, preferably formed of soft iron and held in place by a soft-iron cylindrical casing 18. In the cup-shaped pole-piece is arranged a preferably cylindrical block 20, having a rearwardly-extended shank 21, that extends through the spool and at its rear end has a reduced screw-threaded portion 22 passing through a threaded opening in a soft-iron disk 23. To the rear end of the threaded portion is secured a handle 24, by which the tool may be manipulated, the handle further serving as a means for turning the shank and adjusting the disk toward and from the end of the spool. In order to prevent independent rotative movement of the disk, the casing is provided with one or more projecting pins 25, that are received within openings in said disk. The forward face of the block 20 is recessed for the reception of a set or die 27, that is normally projected by a helical compression-spring 28, excessive outward movement of the die being prevented by a pin or screw 28 fitting in a slot in one side of the die. The face of the die or set is recessed to receive the head of the rivet, and sets or dies having recesses of different sizes may be substituted therefor, as circumstances require. In ordinary devices of this class the dies are formed of steel or other material of a paramagnetic nature, which become magnets when the current is sent through the coil. When the hammer-blow occurs, the holding-magnet is often driven away from the metal, and in so doing carries with it the die, and as the latter is attracted to the rivet said rivet is partly withdrawn and the upsetting operation is interfered with. In carrying out the present invention the die is formed of some material of a diamagnetic or approximately diamagnetic nature, Hadfield's manganese steel being used in some cases, or a steel having a percentage of aluminium to offset or partly neutralize the effect of the current on the paramagnetic metal. This is of importance in that the die when moved back will not carry the rivet with it. A further advantage gained is that the spring will take up the concussion and will permit the holder to move back without separating the die from the rivet.

In Fig. 2 is illustrated a form of tool in which the die is formed integral with the block 20', the spring in this case being dispensed with; but the block and its shank in this instance are formed of a material non-magnetic or approximately so in its nature.

In the constructions shown in both Figs. 1 and 2 the disk 23 is attracted by the electromagnet and serves to force the die more firmly against the rivet-head.

In Fig. 3 is illustrated a construction in which the winding 16ᵃ is arranged on a spool 15ᵃ, that is mounted on a soft-iron casing 18ᵃ. The die 27ᵃ in this instance is in the form of a bar of approximately non-magnetic metal, and its rear end is tapered or inclined to receive the correspondingly-shaped face of an adjusting-key 30 that passes through an opening in the casing 18ᵃ. The outer end of the adjusting-key has an opening for the passage of an adjusting-lever 31 that is pivoted at one end to a lug or bracket 32 on the exterior of the casing. The opposite end of the lever terminates in a handle 33 that is adjacent to the main carrying-handle, and said lever is normally held outward from the main handle by means of a coiled compression-spring 34.

To adjust the die closer to the work it is merely necessary to draw the lever down and thus force the key inward. This adjustment may also be accomplished by an auxiliary magnet or solenoid instead of by hand.

In Fig. 4 is illustrated a further modification embodying substantially the features shown in Fig. 2, save that the electromagnet 16ᵇ is of the horseshoe type.

Fig. 5 illustrates a further modification. In this case the electromagnet 16ᶜ is of the iron-clad type, having an external casing 37, which attracts the disk 23ᶜ and serves to hold the die or set firmly to the rivet. While the die or set in this case is preferably of approximately non-magnetic material, it may in some instances be formed of iron and act as the movable core of a solenoid.

Fig. 6 shows a further modification in which the electromagnet is of the horseshoe type. The two-pole pieces of the electromagnet are united by a cross-bar 40, that is preferably formed integral with a handle 41, of a type now used on pneumatic hammers and similar tools. The cross-bar is recessed to receive the rear or shank end of the die, and in said cross-bar is arranged a slidable wedge 42, bearing against and serving as a means for adjusting the die. The handle is hollow and forms the spool of a solenoid having a winding 44. In this spool is a movable core 45, connected by a wire or cord 46 to the wedge 42. When the winding is energized, the core is moved in the direction of its length, and the wedge moves the die closer to the rivet-head.

Fig. 7 illustrates a further modification in which the magnetic holder is I-shaped in general contour, the central portion receiving the wound spool 15ᵉ. At one end of the die the double-ended pole-piece 49 is recessed at 50 to receive a rivet-head. At the opposite end is a recess 51, receiving a die 27ᵉ, that is pressed outward by a compression-spring 28ᵉ, the construction of this portion of the device being practically the same as that shown in Fig. 1. The second pole-piece 53 is recessed at 54 to receive a rivet-head and at the opposite end is recessed to receive a movable die 27ᶠ, which may be adjusted by means of a slidable wedge 30ᶠ, the latter being moved in any desired manner.

Figs. 8, 9, and 10 illustrate a further modification of the invention. In this case the magnet 50 is provided with an annular recess to receive the coil 16ᴷ. On the outer face of the magnet is a pair of pivot-ears 52, carrying a pin or cross-bar 53, on which is mounted a handled cam 54, and between the ears is guided an arm 55. On top of the magnet is a circumferentially-adjustable washer 56, tapered in thickness from one side to the other, and by adjusting this washer the arm may be disposed at a right angle to the axes of the magnet—that is, parallel with the work—or at any desired angle thereto. The outer end of the arm 55 is upset to form a boss 57, which has a recess 58. In the recess is a disk 59, that is thrust outward by a helical compression-spring 60. The outer face of the disk is dished or cupped for the reception of the correspondingly-shaped end of a die $27^h$, so that the latter may properly receive the rivet-head without regard to the angle of the arm 55. The opposite sides of the recessed boss are provided with slots 61, in which plays a pin 62, passing through the shank of the die in order to prevent displacement of the latter.

Fig. 11 illustrates a further modification in which a bar-magnet carries a die $27^i$ at each end, the current being passed through the coil in either direction in accordance with which end of the device is in use. One end of the bar is inclined, as shown, in order to gain access to rivets in corners and other places.

In using any of the devices a switching mechanism of any desired type is placed in the circuit in a position convenient to the workman, and in all cases where spring-pressed dies are employed it is advisable to have the magnet strong enough to overcome the resistance of the spring.

In Fig. 12 is illustrated a further modification. The die $27^j$ is removable and may be readily replaced by a die of different size when necessary. In this case the shank 21' is provided at its rear end with a plunger 60, that fits within a cylinder 61, counterbored in the end of the casing 18', and said cylinder has a port 62 for connection with a supply of air, water, or other fluid under pressure, in order that the die may follow up the rivet during the heading process. The shank and die are retracted by a spring 63 when the pressure is reduced.

In all cases it is to be understood that the dies are readily interchangeable and that they are so arranged as to follow up the rivet during the heading process, the power employed being either mechanical—$i.\,e.$, a wedge, screw, or spring—or by fluid pressure or magnetic attraction.

Having thus described my invention, what I claim as new, and desire to secure by Letters Patent, is—

1. In an electromagnetic rivet-holder, a die of diamagnetic or approximately diamagnetic material, a die-holder, an electromagnet, and means for permitting relative movement of the parts.

2. In combination, an electromagnetic holder, and a yieldable die carried thereby, said die being formed of diamagnetic or approximately diamagnetic material.

3. In combination, an electromagnetic holder having a die-receiving recess, and a spring-pressed die arranged in the recess, the die being formed of diamagnetic or approximately diamagnetic material.

4. In combination, a casing, a die-shank, a magnet-winding between the shank and casing, a die supported by the shank and concentric with the casing and winding, and means for forcing the die in the direction of the work.

In testimony whereof I affix my signature in presence of two witnesses.

HENDERSON B. DOUGLAS.

Witnesses:
 JAMES O. CAMPBELL,
 T. C. CAMPBELL.